US008515049B2

(12) United States Patent  (10) Patent No.: US 8,515,049 B2
Chavez et al.  (45) Date of Patent: Aug. 20, 2013

(54) SOCIAL NETWORK URGENT COMMUNICATION MONITOR AND REAL-TIME CALL LAUNCH SYSTEM

(75) Inventors: David Lee Chavez, Broomfield, CO (US); David Scott Mohler, Arvada, CO (US); Brett Alan Shockley, Eden Prairie, MN (US)

(73) Assignee: Avaya Inc., Basking Ridge, NJ (US)

( * ) Notice: Subject to any disclaimer, the term of this patent is extended or adjusted under 35 U.S.C. 154(b) by 309 days.

(21) Appl. No.: 12/720,923

(22) Filed: Mar. 10, 2010

(65) Prior Publication Data

US 2010/0246797 A1    Sep. 30, 2010

Related U.S. Application Data (60) Provisional application No. 61/163,559, filed on Mar. 26, 2009.

(51) Int. Cl.
*H04M 3/00* (2006.01)
(52) U.S. Cl.
USPC .............................. 379/265.02; 379/265.13
(58) Field of Classification Search
USPC ............... 379/266.1, 265.02, 266.01, 266.02, 379/88.18
See application file for complete search history.

(56) References Cited

U.S. PATENT DOCUMENTS

| 6,859,529 | B2 * | 2/2005 | Duncan et al. ............. 379/266.1 |
| 7,844,668 | B2 * | 11/2010 | Canning et al. ............... 709/206 |
| 2002/0131399 | A1 * | 9/2002 | Philonenko .................. 370/351 |
| 2002/0133557 | A1 | 9/2002 | Winarski |
| 2007/0086064 | A1 | 4/2007 | Koyama |
| 2008/0118052 | A1 * | 5/2008 | Houmaidi et al. ....... 379/265.11 |

FOREIGN PATENT DOCUMENTS

| EP | 1102462 | 5/2001 |
| EP | 1435725 | 7/2004 |
| EP | 1545103 | 6/2005 |
| JP | 2003-076686 | 3/2003 |
| JP | 2006-031316 | 2/2006 |
| JP | 2006-303607 | 11/2006 |
| WO | WO 98/37680 | 8/1998 |
| WO | WO 01/01264 | 1/2001 |

OTHER PUBLICATIONS

Search Report for U.K. Patent Application No. GB1004883.3, dated Jul. 19, 2010.
Nagano "Blog Search," Internet Magazine, Impress Corporation, Japan, Dec. 1, 2005, No. 131, pp. 38-41 (Cited in Sep. 6, 2012 Office Action for Japan Patent Application No. 2010-071166).
Official Action with English Translation for Japan Patent Application No. 2010-071166, mailed Sep. 6, 2012 5 pages.

* cited by examiner

*Primary Examiner* — Amal Zenati
(74) *Attorney, Agent, or Firm* — Sheridan Ross P.C.

(57) ABSTRACT

A complete social network based, urgent matter, communications solution and response system is provided. The system can monitor one or more social networks (or other sources of information) for the presence of keywords, scalar urgency ratings, the identity and/or number of the parties submitting the urgent requests, temporal factors such as day, date, time, time zone, or the like, in an effort to determine which social network posts or communications are urgent, and optionally prioritize or rank pending urgent matters. The system can also determine who should be involved with solving or addressing the urgent matter. The system can also determine the presence of the parties needed to solve the urgent matter, and can, based on the presence information, setup a real-time or near real-time communications session between the parties to address the urgent matter.

14 Claims, 4 Drawing Sheets

SOCIAL NETWORK URGENT COMMUNICATION MONITOR AND REAL-TIME CALL LAUNCH SYSTEM

RELATED APPLICATION DATA

This application claims the benefit of and priority under 35 U.S.C. §119(e) to U.S. Patent Application No. 61/163,559, filed Mar. 26, 2009, entitled "Social Network Urgent Communication Monitor and Real Time Call Launch System," which is incorporated herein by reference in its entirety.

FIELD OF THE INVENTION

One exemplary aspect of the present invention is directed toward communications, and more specifically toward addressing questions and/or comments posted on the internet. Even more particularly, one exemplary aspect is directed to determining whether the question and/or comment is urgent, and routing the question/comment, if determined to be urgent, to one or more responders that may include, for example, customer service agents in a contact center type of environment. The question/comment can then optionally be answered by an agent.

BACKGROUND OF THE INVENTION

Some companies assign resources to monitor blogs, Twitter®, discussion forums related to the company's products and services, and other Internet sources of information. Some have also established a presence on Facebook® that is monitored by one or more employees and/or so-called "web scraper" applications. There are multiple ways to monitor these sites for activity related to a company and its products and services:

1. Use each site's primary web interface. This can be time consuming as it requires manually browsing the site, perhaps using search features, with each site presenting a different user experience.

2. Use tools provided by or for each site to filter content. Twitter® in particular has an active third party developer base that uses the Twitter® API to find content of interest, such as TweetScan®. This may allow automating of some of the search capabilities, but it is specific to the Twitter® site, so different tools with different capabilities would be used.

3. Many websites (blogs, discussion forums, Twitter®) provide feeds using RSS or Atom, so a person monitoring more than one service might use a feed reader, and then manually search for posts that require a response and forward them to an appropriate company representative.

4. Use a general tool such as Google® Alerts®, which monitors many web sources (e.g., news, web, blogs, video, groups . . . ) for specified search terms and deliver the results as an email or RSS/Atom feed. This is similar to No. 3 above, but it does not currently support Twitter® and may not monitor every blog of interest. Mysyndicaat.com is a similar service that aggregates content from websites, discussion forums and blogs based on keyword searches and provides the output in a viewer page or as an RSS/Atom feed.

SUMMARY

With the emergence of Web 2.0, traditional customer service channels are being bypassed as people seek assistance through the web using unsponsored message forums, blogs, Twitter®, Facebook®, GetSatisfaction®, and the like. Questions and complaints about a company's products and services may go unnoticed by a company because the company is not paying attention to these "Customer Service 2.0" channels.

Unlike a company sponsored site, which may categorize posts based on specific products and services, posts discovered by the above techniques will typically not be categorized by the user—the end user may just enter a complaint or question about the company on Twitter® or GetSatisfaction®. The company representative who discovers that comment will need to analyze it to determine if it needs a response, and determine who in the company is best qualified to provide that response, usually through an email or IM. The responder then needs to get the response back onto the source site where the comment was originally discovered. This may require a lot of coordination between the people assigned to monitor the Internet for the company, and the people qualified to address specific questions and complaints.

More generally, a social network is nodal structure of people and/or entities that are related in one or more ways. The relationship can be work, personal, interest based, or the like. The nodal structure can be shown by the nature of the common relationship, or its interconnections with a specific person involving a variety of relationships. These social networks, and the information they convey, are replacing enterprise directories, contact management tools, and the like. The advantages of these social networks for communications are that they show structure, they contain information about the members, they allow multi-modal communications via a single unified link (social network) and they are easy to use. Another advantage is illustrated when a member leaves a social network, their remaining relationship structure shows other contacts who may be able to help with the tasks/role/work that the departing member performed. As a result, businesses are likely to do more communications within their own business, with customers of the business, and with vendors to the business and the like, using social networks.

One problem with social networks though is there is not currently any means to alert parties that an urgent post or request is present. Another problem is that if such an urgent post or request has arrived, there is no way to integrate presence and calendar information to determine if the interested/involved parties can communicate about the urgent matter in real-time or near real-time. Yet another problem with urgent posts or requests on a social network is that there is no automated coordination or reporting of any efforts to address or solve the urgent post or request. In order for businesses to use social networks as an effective way to communicate with good customer satisfaction, one should solve these problems.

For example, one exemplary aspect of the invention is directed toward searching one or more social networks (or other sources of information) for urgent posts or requests, determining who would be interested in, or who needs to be involved with, the urgent matter, checking for the presence of such interested/involved parties, creating a real-time or near real-time communication session between two or more parties, and responding with solutions, answers, and updated status, or progress about the urgent matter.

According to another exemplary embodiment, a complete social network based, urgent matter, communications solution and response system is provided. The system can monitor one or more social networks (or other sources of information) for the presence of keywords, scalar urgency ratings, the identity and/or number of the parties submitting the urgent requests, temporal factors such as day, date, time, time zone, or the like, in an effort to determine which social network posts or communications are urgent, and optionally prioritize or rank pending urgent matters.

The system can also determine who can be involved with solving the urgent matter, who would be interested in the urgent matter, who would be impacted by the urgent matter, and the like, via, for example, entries and information contained in the same, or another social network structure. This system can also determine the presence of the parties needed to solve the urgent matter, and can, based on the presence information, setup a real-time or near real-time communications session between the parties to address the urgent matter. Additionally, a helper application can be used to assist with recording, form filling, transcoding, applying automatic speech recognition (ASR), formatting content for another communication modality, and the like, to assist with responding to communication identified as urgent.

Moreover, the status of and/or the solution to the urgent matter could be communicated to the party(s) originally posting the matter and/or the interested parties, impacted parties, industry and/or government agencies, or the like. Metrics like the number of urgent matters, elapsed time to solution of urgent matters, escalation of urgent matters, staffing needed to support urgent matters, and the like, could be produced, tracked, and distributed by the system.

The exemplary system can also be agnostic to what form the urgent communication arrived in, and could provide the necessary text-to-speech (TTS), ASR, transcoding, summaries, completed forms, or the like, as needed to assist with triggering an automatic communication session, that could be real-time. Similarly, the system can return the status of and/or solution to an urgent matter in the native format of the original request. The system can also reference prior urgent request summaries in some form to determine if a real-time communication session is needed, or if the same problem has been previously solved, and if so, relay the solution to the appropriate places, parties, internet destinations, or the like. In such a way, only net new or unsolved variations of urgent matters require real-time communications sessions. The system can also identify trending information so that proper business rules, such as routing within a contact center, can be altered based on the trend.

An illustrative embodiment of the system could begin with an urgent post to a manufacture's social network about a serious product defect. Keywords, marked urgency, the product name, the posting party's identity, the nature of the product defect, and the like, could be considered to assist with determining relative and absolute urgency. Assuming in the case of this example, if the product defect is truly urgent, the system could look up engineers, product managers, production managers, safety/compliance staff, the legal department, or the like, to determine who is necessary to work on and solve the problem as well who must stay informed about or would be interested in the solution. The system can take the identities of the people needed to work on the problem and determine their presence information. At the first opportunity that all the people needed to work on the problem have in common, a real-time communication session could be created. Depending on the timing of this real-time communication session, an e-mail client or similar invite could be created to notify the parties about the real-time session. Once the real-time communication session begins, any one of the participants could trigger features to produce a usable output from the real-time communication session. One output could be an e-mail to the parties who posted on the social network about the defect explaining what they should do with their product. Another output could be a detailed letter to the consumer product safety commission documenting the product(s) affected, the problem, the solution, and whether a recall applies. Yet another output could be information for the company's contact center to be able to answer questions about the product. Detailed information such as a transcript of the real-time communication sessions(s) used to solve the problem and the original urgent matter post could be sent to manufacturing and/or vendors as needed to permanently solve the problem. Once the problem is solved, information could be maintained in some sort of database or structure for future reference.

Another exemplary embodiment is directed toward an ability to monitor one or more social networks, including posts, requests, or the like, determine when such information is urgent, determine who should be involved or interested in solving the urgent matter, determining a presence of such interested/involved parties, involving those parties via real-time communication session and ultimately solving or providing status regarding the post or request in an automated, semi-automated and/or structured manner.

Another exemplary embodiment is directed toward an ability to monitor progress toward the resolution of the urgent matter and create an ongoing communications session to manage the information and/or the complex communications between the parties such as versioning of documents related to the urgent matter, side bar work group communications, and the like.

As discussed, one aspect of this invention is directed toward determining whether information posted on the Internet is urgent. For example, this could be accomplished via a number of different techniques including one or more of filtering, artificial intelligence, neural networks, human input and/or analysis, or in general via any methodology that allows the determination as to whether information, such as a post, is urgent. For example, information such as whether there is an implied threat, whether the post appears to be "reaching out," whether there is "choice" language, business reasons, the specificity about the problem or matter, whether there is a negative description, information such as names, phone numbers, quotes, customer service information, part numbers, or the like, time and place information, keywords, analysis of the number of posts and recency, as well as such information as author weighting, such as hits, followers, posts, etc., and any optional cross-correlation of the post to other information such as contextual records, other posts, or the like. Moreover, mashups can be used to further assist with determining whether a matter is urgent. Based on one or more of the above, a determination can be made as to whether a matter is urgent, and, if so, forwarded to a decision engine such that one or more of automatic spawning of an appropriate mechanism to respond to the matter can be generated, and thereby reduce the delay associated with responding to urgent matters.

Another problem with these types of posts is their viral nature. For example, before a company or entity is even aware of a problem, the viral nature of information spreading on the internet can lead to a ground swell of negative publicity that may or may not be actually based on fact. By streamlining the processes by which urgent matters are handled and identified, one exemplary aspect of this invention aims to reduce the time lag between when the information is posted on the internet and when and how an entity responds.

Accordingly, an exemplary aspect of this invention is directed toward communications management.

More specifically, another exemplary embodiment is directed toward obtaining information from one or more sources and determining whether the information should be addressed in an urgent manner.

An additional exemplary embodiment is directed toward harvesting information from one or more of blogs, discussion forms, social networking sites, news, web, blog, video feeds, groups, or sites with, for example, a dedicated API or RSS feed, accessing whether the information should be handled in an urgent manner and routing the information appropriately.

Another exemplary embodiment is directed toward a content aggregator that harvests content from one or more sources, determines whether the content is urgent, and automatically routes the content for handling to one or more appropriate parties.

Even further aspects of the invention are related to a technique for assessing whether information found on the internet is urgent.

Additional aspects related to upon determining that a matter is urgent, automatically determining one or more appropriate parties and/or experts that are capable of responding to the urgent matter, optionally including an analysis of presence information associated with who the urgent information should be forwarded to.

Event further aspects of the invention relate to one or more responder networks that are capable of addressing matters identified as being urgent.

Additional aspects of the invention relate to one or more of an interaction center, contact center, and call center, that are capable of handling one or more matters identified as being urgent.

Event further aspects of the invention relate to utilization of a decision engine to automatically spawn communications to one or more individuals or entities identified as being capable of handling an urgent matter.

Even additional aspects of the invention relate to determining who is an expert, and including the one or more determined experts in one or more conversations or exchanges to address the matter identified as urgent.

Additional aspects of the invention relate to an ad-hoc network that includes one or more responders, each having a particular skill set or expertise level, that are equipped to handle and address one or more urgent matters via a plurality of communications modalities.

In accordance with another exemplary embodiment, RSS (Really Simple Syndication)/ATOM feeds can be leveraged to facilitate monitoring feeds from multiple internet sites and automatically forward the information to a content aggregator for determination as to whether a post is urgent.

Additional aspects are directed to sorting internet-based communications into urgent and non-urgent categories prior to receipt at an automatic call distributor at a call center, and handling the urgent communications in a special manner. For example the filtering could be performed by a third party.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible, non-transitory, storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide responses to internet/intranet posts. For example, the systems and methods disclosed herein will also work well with SIP-based communications systems and endpoints. Moreover, various endpoints usable with the present invention can be any communications device such as a PC, telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

A number of variations and modifications of the invention can be used. It would be possible to provide or claim for some features of the invention without providing or claiming others.

Some of the exemplary systems and methods of this invention have also been described in relation to a Customer Service 2.0/Web 2.0 environment which commonly associated with web applications that facilitate interactive information sharing, interoperability, user-centered design, and collaboration on the Internet. Examples of Web 2.0 include web-based communities, hosted services, web applications, social-networking sites, video-sharing sites, wikis, blogs, mashups, and folksonomies. A Web 2.0 site allows its users to interact with other users or to change website content, in contrast to non-interactive websites where users are limited to the passive viewing of information that is provided to them. However, to avoid unnecessarily obscuring the present invention, the description omits a number of known structures and devices common to this environment. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

As will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Figure 1:
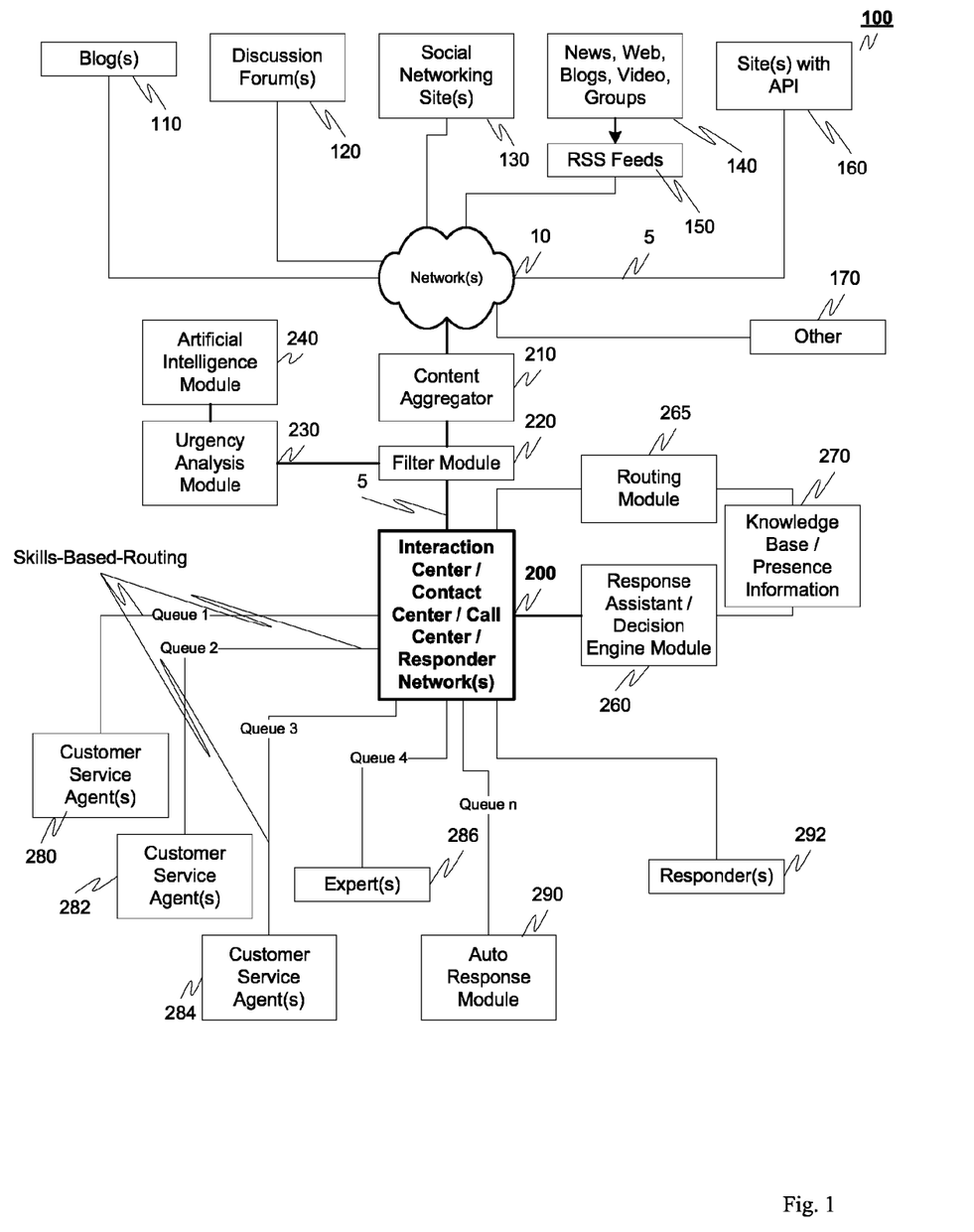
FIG. 1 illustrates an exemplary communications environment according to this invention.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

FIG. 1 illustrates an exemplary communications environment 100. The communications environment 100, in addition to conventional and well-known components, includes one or more web resources, such as blogs 110, discussion forms 120, social networking sites 130, news, web, blogs, video and group feeds 140, and one or more sites that have a dedicated API 160. Each of these resources can be associated with, for example, an RSS/Atom feed 150, or a comparable technology that allows the feeding, forwarding, or automatic handling of frequently updated information. A typical RSS enabled document or site, which is also known as a web feed or channel, can include full or summarized text, plus metadata associated with a particular feed. In general, information such as questions, posts, comments, articles, and the like, can be derived from any of the above information sources, and in general, from any endpoint(s) on a distributed network including mash-ups, portals, wikis, user-generated content, consumer-generated content, consumer-generated media, social media, industrial media, website(s), and the like, generally represented by information source 170.

The communications environment 100 also includes a content aggregator 210, a filter module 220, an urgency analysis module 230, an artificial intelligence module 240, an interaction center/contact center/call center/responder network 200, a response assistant/decision engine module 260, a knowledge base/presence information module 270, and a routing module 265, all interconnected via one or more links 5 and networks 10. In addition, the interaction center/contact center/call center/responder network 200 can be connected to one or more agents, such as customer service agents 280, 282, and 284, as well as to one or more experts 286 and an auto response module 290. In addition, the system can be connected to one or more responders 292.

In addition, the communications environment 100 can include, for example, a text-to-speech (TTS) module, a speech-to-text (STT) module, a media translation module that, for example, allows translation of a video into a speech description thereof, and the like.

In operation, information from one or more of the information sources (110, 120, 130, 140, 160, 170) is forwarded, via links 5 and network 10, to the content aggregator 210. As discussed, the information from the various sources can be gathered with the assistance of, for example, an RSS/Atom feed, API, or in conjunction with a searching tool that, for example, searches for specified predetermined terms and/or content, and delivers the same, for example, via an e-mail, SMS, or RSS/Atom feed, to the content aggregator 210. This same technology could also be applied to any type of multimedia content. For example, a company can enter their company name, product names, service names, or the like, and have a forwarding service provide the information that contains any of these key terms to the content aggregator 210. The form of the supplied information can be in any one or more of textual, an e-mail, a hyperlink, an SMS, an html-based communication, an RSS feed, via an API (Application Program Interface), or the like, or in general in any modality that allows for subsequent analysis of the content by the urgency analysis module 230 and distribution by system 200.

The interaction center/contact center/call center/responder network 200 can optionally be associated with any one or more of the information sources. Once an association is made, a content aggregator 210 can begin receiving information from the various sources to aggregate the disparate information source feeds. However, center 200 need not necessarily be associated with any particular information resources to receive information therefrom. As discussed, an agent, bot, or the like, could scan one or more portions of a distributed network, looking for, for example, one or more terms that could then be analyzed by the urgency analysis module 230 to determine whether it is content that needs urgent handling— appreciating that the information from all the information sources may or may not require some type of response. Should it require a response, a determination can be made whether the response needs to be handled in an urgent manner. Thus, upon reception of the various types of information by the content aggregator, and in cooperating with the filter module 220, urgency analysis module 230, and optionally the artificial intelligence module 240, a determination is made whether the received information should be handled in an urgent manner.

The interaction center/contact center/call center/responder network 200 can be embodied in numerous different manners depending on the environment in which the systems and techniques disclosed herein are implemented. For example, the techniques could be implemented in an interaction center, or call center, or contact center, which are centralized systems that can be used for the purpose of receiving, managing, and distributing large volumes of communications, such as calls via telephone. However, with the advance of the Web 2.0 customer service model, these centers have also been adapted to handle other types of incoming communications, such as those in the form of e-mails, instant messages, and the like. Typically associated with one of these centers are a PBX that provides functionality such as automatic call distribution, interactive voice response, and skills-based routing. Comparable technologies also exist that allow the extension of traditional contact center technologies to the Web 2.0/Customer Service 2.0 environment.

In addition to the more formalistic contact center type of architecture that allows for the handling of urgent matters discussed hereinafter, a less formalistic, for example, ad-hoc network, can also be used with the techniques of this invention and generally will be referred to as a responder network 200 that includes one or more responders 292. For example, this construct allows for one or more individuals, entities, or the like, to establish a responder network that is equipped to handle matters identified as urgent. For example, this network could be established for a group of users that, for example, manage a web portal. In a similar manner, the responder network 200 and responders 292 could be a demographic of experts that are interested in a specific topic. The handling of matters identified as urgent could then be routed in similar matter as in the call center environment.

Therefore, the terms interaction center, contact center, call center, and responder network will be used interchangeably as used herein based, for example, on the particular environment in which the techniques disclosed herein are implemented. As will therefore be appreciated, for certain implementations there may be associated certain customer service agents, queues, skills-based routing technology, and the like, to further facilitate the handling of an urgent matter. In addition, and as discussed hereinafter, the contact center 200 may also cooperate with an auto response module 290 to facilitate an automatic handling of a matter identified as being urgent.

Upon receipt of the information from one or more of the information sources, the filter module 220, cooperating with the urgency analysis module 230, and optionally the artificial intelligence module 240, determines whether a matter is urgent. For example, one or more of the following can be utilized to assist with determining whether a matter is urgent:

Whether or not the post includes threats, either implicit or explicit,

Whether the matter includes "choice" language,

Whether the matter appears to be "reaching out" for assistance,

What is the degree of specificity regarding the nature of the problem,

Whether the matters appears particularly negative,

Whether the matter includes specific information such as names, phone numbers, part numbers, model numbers, a quotation from, for example, a repair person, customer service agent, and the like, Whether there is specific time and/or place information, Whether the matter contains specific key words, Whether a number posts have been received regarding the same matter, What is the recency of posts on a similar matter, Whether that matter can be correlated to other information such as other recent calls at a call center, Whether there appears to be numerous posts about the same issue, or the like, Whether the posts appears to be corroborated, Whether the author or contributor of the information appears credible based on one or more of the number of hits to the posting, a number of followers, the number of posts made, the number of views of the information, or in general any characteristic that adds credibility to the source of the information, Whether the matter can be correlated to other similar matters, that are for instance stored in knowledge base 270, and are directed toward the same issue, Whether mashup information adds credibility to the source of the matter, and Whether the utilization of artificial intelligence assists with quantifying whether a matter is urgent that may or may not be able to be addressed by any of the above characteristics.

The urgency analysis module 230 can also look for specific tags that may indicate the matter is urgent. For example, with the cooperation of information in the knowledge base 270, an assessment can be made as whether the source of the information has previously supplied information that was determined to be urgent. For example, if there is a particular source of information that appears to be credible, and this source has repeatedly brought to the surface topics that are always or almost always identified as being urgent, information from that source can be tagged and prioritized by the urgency analysis module 230 to facilitate the determination as to whether a newly received matter is urgent, and if so, that matter handled in a expeditious manner by the center 200.

Based on one or more the above characteristics, a decision is made as to whether the matter is to be identified as urgent. If the matter is identified as urgent, and in cooperation with the response assistant/decision engine module 260, the matter is queued for handling.

As with any portion of the techniques implemented herein, the information, decisions, routing, and the like, can optionally be logged and saved in, for example, an information store. In addition, and as alluded to above, certain types of information can be stored in knowledge base 270 to assist with future determinations as to whether a particular received matter should be categorized as urgent.

Once identified as urgent, a matter is queued for handling and, with the cooperation of the routing module 265 and optionally presence information 270, one or more appropriate parties are identified to handle the urgent matter. For example, the urgent matter can be placed in one or more queues, for example using skills-based routing, and the matter forwarded to one or more customer service agents 280-284. In a similar manner, if it is determined that the matter should be handled by a subject expert, the matter can be queued in queue 4 for the expert(s) 286. Additionally, or alternatively, the matter could be handled by an auto response module 290, such as the instance when the matter has already been responded to, and an appropriate response has already been formulated. In this instance, it may not be necessary to invoke the skills of a customer service agent with the matter being handled automatically and a response sent. As will be discussed hereinafter, the response can be one or more of to an author or a post, a follow-on post on, for example, a blog, discussion forum, social networking site, or the like, a communication such as a call, to the source (author) of the information, or the like. In general, any type of response in any of type of modality can be utilized provided the necessary information is available that allows a contact to be initiated to the source of the information.

As is to be appreciated, the urgent matter can be handled via the traditional queue and skills-based routing techniques. However, in accordance with one exemplary embodiment of the invention, the response assistant 260, cooperating with the routing module 265, and presence information 270, determine the appropriate party(s) for handling the matter. In addition, the response assistant 260 and routing module 265, with the cooperation of the knowledge base 270, can determine whether one or more experts should optionally be included in handling the urgent matter, or whether they should be the exclusive recipients to address the urgent matter. For example, the knowledge base 270 can include information that identifies particular subject areas of expertise of one or more experts in one or more categories. This information can be compared to, for example, key words in the matter indentified as urgent and this information used to assist with routing the urgent matter to the appropriate party(s).

A tiered approach can also be utilized to assist with routing the urgent matter to the appropriate party(s). For example, the routing module 265 could initially identify a first party(s) that should handle the urgent matter. If it is determined, for example, based on presence information, the first party is not available, the routing module 265 could then look to the next party(s) and their associated presence information, to determine their availability. This could continue until an appropriate party(s) is found, that is immediately available, to handle the urgent matter.

Optionally, and depending upon an assigned degree of urgency and/or sensitivity to the matter, the non-available party(s) could be notified of the urgent matter. For example, a communication, such as an e-mail, voice message, or the like, could be sent to the non available party(s) indicating the nature of the urgent matter with, for example, a copy of the urgent matter, a paraphrased version of the urgent matter, or the like. The status of the non available party could be monitored to determine whether or not they changed their presence information to become available to address this urgent matter.

Once the party(s) have been identified that are going to handle the matter, an optional embodiment includes the ability to initiate a real-time communications session between parties (assuming there are multiple parties identified to handle the matter) and optionally one or more experts. This real-time communication session could be via any communications modality to facilitate the group handling of the urgent matter. In addition, and in cooperation with the routing module 265 and response assistant 260, information regarding the matter is forwarded to the parties. This information can also include other information determined to be relevant, such as information of prior related matters from the knowledge base 270, information about related posts or matters that are being addressed by the system (from the same or a different source), a confidence score that reflects systems confidence about the actual urgency of the matter, and in general, any information that may be helpful in assisting with addressing the urgent matter. For example, the routing module 265 could utilize knowledge in the knowledge base 270, such as documents, technical bulletins, white papers, or the like, and forward these along with the urgent matter to the identified party(s) that are assigned with responding thereto.

In addition, and again in cooperation with the routing module 265 and response assistant module 260, a template can be provided to assist with the party(s) identified for responding to the urgent matter that streamlines their ability to respond. For example, this template can include the necessary information to allow for an e-mail to be returned to an interested party. In a similar manner, the necessary information for responding to a phone conversation, press release, follow-up post on the web forum, discussion group, or the like, could similarly be initiated. In general, any useful information that assists with responding to the urgent matter could be pre-populated in a template, or utilized to facilitate the initiation of a communication to address the problem could be utilized by the response assistant 260.

In addition, this template could be shared by the one or more parties identified as needing to address the urgent matter, such that a collaborative work could be generated for responding to the issue. Moreover, a mashup could be utilized to assist with determining the appropriate party(s) to respond to the source of the urgent matter. For example, an information store, the internet, or in general any resource could be queried and utilized as input to a mashup to assist with, for example, correlating a screen name to a particular person, phone number, e-mail, or in general any information that provides insight as to the party responsible for the urgent matter. For example, if the source of the information had previously called a contact center about a related problem with the same product, and during that conversation the user's e-mail address, address, phone number, and name were obtained by a customer service agent, and is determined that the urgent matter could be associated with this e-mail address that is already in the knowledge base, then the contact information associated with that e-mail address could be provided to the parties that are addressing the matter.

In another exemplary embodiment, presence information is used to help determine which party(s) should be alerted upon the arrival of an identified urgent matter. The presence information can be utilized and not necessarily in the traditional fixed business process manner, but can rather be dynamic such that the system can recognize a conditional presence, where a user is allowed to change their status based on, for example, the notification of the arrival of an urgent matter.

In addition, it should be appreciated that the interested party(s) may not be an individual, but they could be a group of individuals, a team, department, or in general any individual, entity, group of individuals, or the like.

For example, the knowledge base 270 can include a subject matter expertise database. This database can tie in who is an expert and include them in any conversations regarding the dispensation of the urgent matter. For example, and similar to the way the filtering is performed, this specificity and/or content of the urgent matter can be analyzed and routed to include particular subject matter experts. These experts can include not only business process experts, but also technical experts. By trying to identify the most appropriate entity to handle an urgent matter, the number of hops is minimized between the identification of the urgent matter, and the handling thereof.

As an example, in a contact center type of environment, a business is monitoring multiple sources on the internet to secure feedback about a number of product lines. During the course of the monitoring, a post on a web forum that is dedicated to a discussion of one of the products in the product lines has a posting about a problem a user experienced shortly after purchased. In the posting, the date the product was purchased, the store the product was purchased from, price paid, and serial number of the product was listed. Additionally, there was a detailed report, with pictures, discussing the problems the user had experienced, and asking whether any other forum members have seen or experienced the same problem, and if they had, did the company do anything to repair the product. This information is received by the filter module 220, and in cooperation with the urgency analysis module 230, it is determined that the posting is urgent. In this particular example, the urgency analysis module 230 detects a threshold number of key words and on that basis decides that the matter is urgent. In addition, the analysis module 230 queries the knowledge base 270 and determines that while this particular problem does not seem to exist in the knowledge base, the author of the posting appears to have had several prior interactions with the company about other products, with all of the prior interactions indicating the customer's complaint appeared to be legitimate. Based on this, the urgency analysis module 230 assigns a very high degree of confidence to the matter. In addition, the urgency analysis module 230, cooperating with the routing module 265, and based on the information in the knowledge base 270, assembles additional information to be forwarded with the matter. In this particular instance, since the individual who authored the post is known, information such as the author's full name, address, and phone number are present in the knowledge base 270. This information is appended to the now urgent matter and forwarded to an appropriate team for handling.

In this particular exemplary instance, the team identified as the target for handling the matter is the team in charge of development and support for this particular product. In this case, there are 16 members, with each the team members receiving a copy of the urgent matter and related information. Additionally, and in cooperation with the response assistant 260, the presence of the team members is determined, and an interactive session established between the team members that are available to discuss the identified urgent matter. In addition, the urgent matter is optionally queued for a customer service agent such that as soon as a team has formulated a response, the customer service agent can communicate that response to the author of the post. In this particular example, and given the nature of the complaint, the customer service agent is provided with the phone number of the author, with the customer service agent's equipment capable of automatically initiating a call to the author of the posting for communication of the manner in which the company desires to resolve the particular matter.

In another exemplary embodiment, there is a group of engineers that has a keen interest in sustainable and renewable energy. They establish a responder network that with an urgency analysis module 230, filter module 220, and content aggregator 210, harvests information from various sources on the Internet, and makes a determination as to whether the information should be handled in an urgent manner. In addition, this group indentifies specific areas of interest that each of the members have, with those members being the recipients of urgent matters in those particular technology areas. These areas of expertise are known by the decision engine module 260, and used in cooperation with the routing module 265 to assist with routing any identified urgent matter to the appropriate party(s). In operation, there is a posting on an Australian web forum that indicates there's been an interesting breakthrough in photovoltaic research. The author of the posting has a Ph.D., and has written numerous articles on photovoltaics. Upon receipt of this posting by the filter module 220, and the urgency analysis module 230, the urgency analysis module 230 automatically configures a mashup and determines that not only is the author a Ph.D. from a well respected university, but the author of the posting has also authored over 60 white papers on comparable subjects and has given a number of presentations on the technology.

Based on this information, the urgency analysis module 230 assigns a high degree of confidence that the matter is urgent, and tags the matter as "urgent" so it can be forwarded to the team member with a corresponding technical interest. In addition, and in cooperation with the routing module 265, the urgency analysis module 230, artificial intelligence module 240, and knowledge base 270 cooperate to assemble links to the various types of information that were used in determining that the matter was urgent. In this particular case, links to various white papers, the author's resume, and links to the symposiums where the author spoke are included with the content of the post identified as urgent. Since this particular posting has to do with increased solar efficiency on cloudy days, and there is a specific team member with that interest, all the assembled information is forwarded to that team member (as well as information extracted from the author's biography such as e-mail address, phone number, and address, that can be also given to the team member) to assist with the team member responding to the post. In addition, information regarding the source of the post, such as the particular web forum it was posted on, can also be included with a link to the appropriate page with instructions indicating on how the team member can join that forum if they are not already a member.

Figure 2:
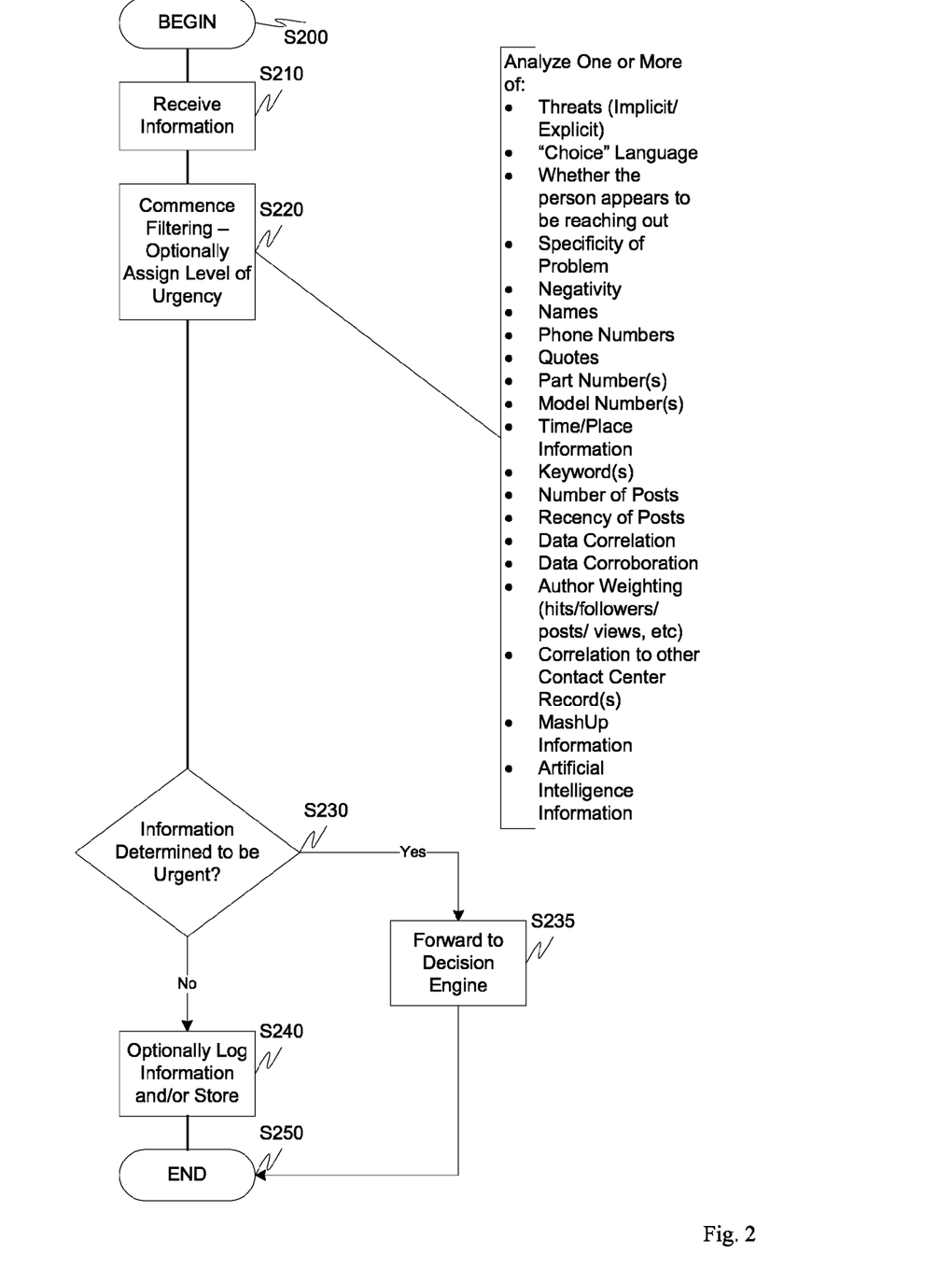
FIG. 2 is a flowchart outlining an exemplary method for filtering information according to this invention.

FIG. 2 outlines an exemplary embodiment for filtering information from one or more information sources according to this invention. In particular, control begins in step S200 and continues to step S210. In step S210, information is received from one or more sources, such as blogs, discussion forums, social networking sites, news, web, video feeds, groups, inter or intranet sources, or the like. Then, in step S220, filtering is performed on the received information. Control then continues to step S230.

In step S230, a determination is made whether the matter is urgent. If the matter is urgent (with an optional level of urgency assigned based on a degree of confidence about the urgency of the matter), control jumps to step S235 where the matter is forwarded to a decision engine for routing to one or more appropriate parties. Otherwise, control jumps to step S240, where the information can optionally be logged and are stored in, for example, an information store. Control then continues to step S250 where the control sequence ends.

Figure 3:
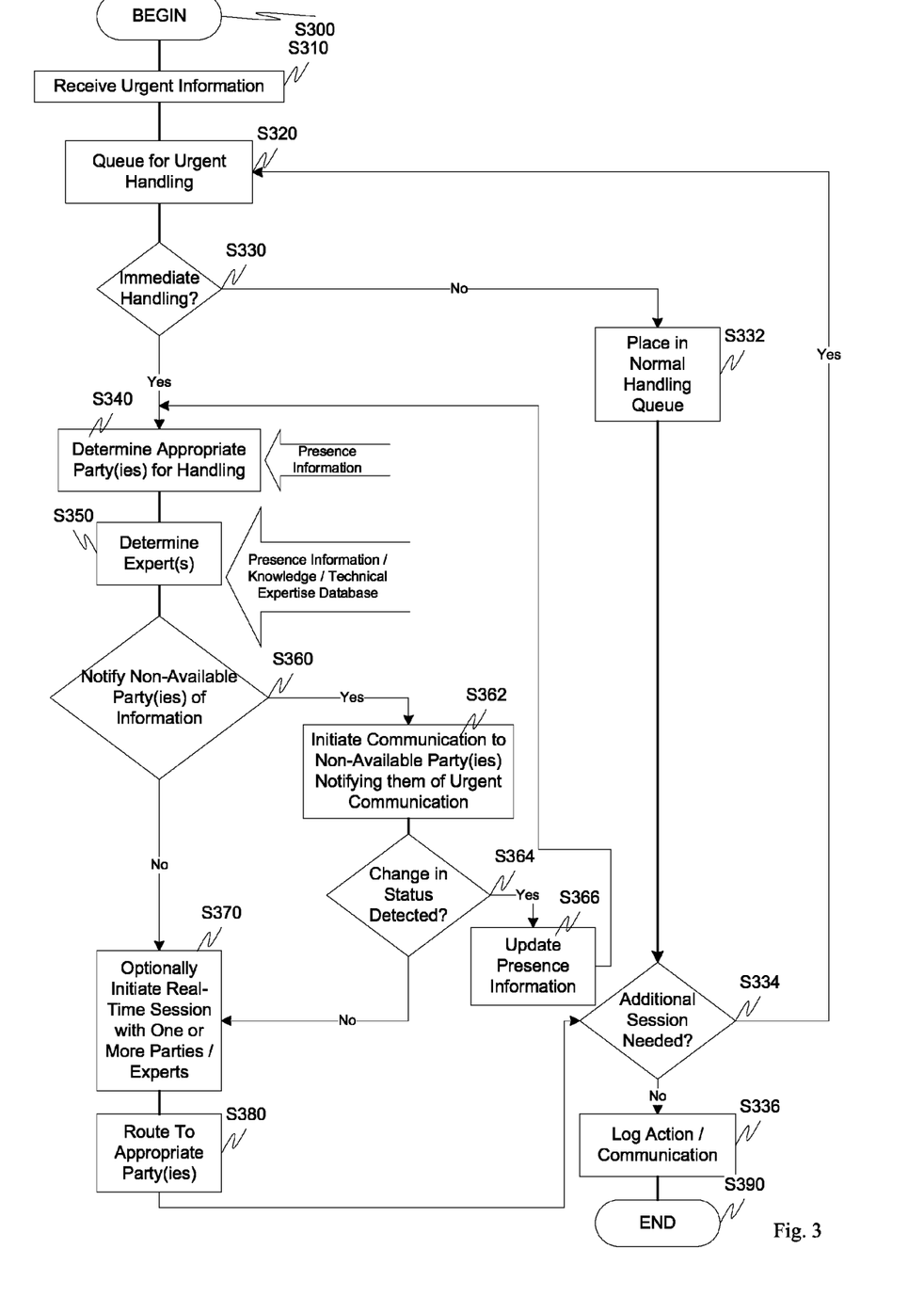
FIG. 3 is a flowchart outlining an exemplary method for handling an urgent matter according to this invention.

FIG. 3 outlines an exemplary method for handling of a matter identified as being urgent. In particular, control begins in step S300 and continues to step S310. In step S310, the urgent matter is received. Next, in step S320, the matter is queued for handling and in step S330 a determination is made as to whether immediate handling is required. If immediate handling is not required, control continues to step S332 where the matter is placed in the normal handling queue S332 with control continuing step S334.

In immediate handling is required, control continues to step S340. In step S340, the appropriate party(s) are determined for handling the matter. As discussed, this determination can also include the integration of presence information such availability can be further used as the basis for determining the appropriate party(s). Next, in step S350, optionally one or more experts can also be identified to assist with handling the urgent matter. This determination can be based also on presence information as well as knowledge and/or technical expertise stored in one or more databases. Control then continues to step S360.

In step S360, a determination is made whether a notification should be sent to one or more parties, that based on their respective presence information, are not currently available. If a notification is to be sent, control continues to step S362 where a communication is initiated to the non available party notifying them of the urgent communication. As discussed, this notification can include specifics about the matter and in general the necessary information for them to determine whether they would like to change their status. Next, in step S364, a determination is made whether a change in their status has been detected. If a change in status has been detected, control continues to step S366 where the presence information is updated with control continuing back to step S340. Otherwise, control jumps to step S370.

In step S370, a real-time communications session can optionally be established between parties identified as appropriate for handling the urgent matter. For example, this real-time communications session can be a telephone conference, a webinar, or in general any type of collaborative communication session that allows the parties identified to handle the matter to collaborate and formulate a response. Next, in step S380, information regarding the urgent matter can also be forwarded to the appropriate parties via, for example, e-mail, a text message, or in general any modality appropriate and/or available. Control then continues to step S334.

In step S334, a determination is made whether an additional communication session is needed to further address the urgent matter. If an additional session is needed, control continues back to step S320 with control otherwise continuing to step S336. In step S336, the various actions, communications, collaborations, and the like can optionally be logged and recorded with control continuing to step S390 where the control sequence ends.

Figure 4:
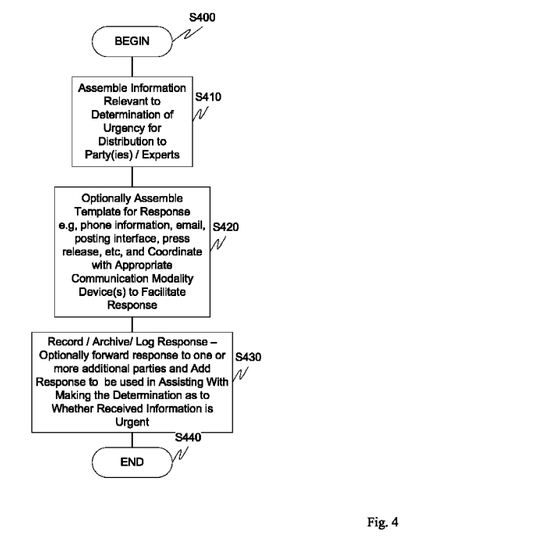
FIG. 4 is a flowchart outlining an exemplary method for a technique to assist an entity in responding to a matter identified as urgent.

FIG. 4 outlines an exemplary method for assisting with responding to the urgent matter according to an exemplary embodiment of this invention. In particular, control begins in step S400 and continues to step S410. In step S410, information relevant to the determined urgent matter is assembled and distributed to the various parties. As discussed earlier, this can include not only, for example, a copy of the urgent matter, but can also include other information determined to be relevant to the urgent matter. Next, in step S420, a template can optionally be assembled that facilitates the responding to the urgent matter. As discussed, this can include a creation of an e-mail, the spawning of a telephone call, an appropriate interface to post a response or follow-up post to the urgent matter, or the like. The assembling of the template can also be coupled with the appropriate interfaces, communications equipment, and the like to facilitate the communication of the response to one or more entities, locations, internet sites, or the like. Then, in step S430, the various activities can optionally be recorded and logged, and further optionally forwarded to one or more additional parties and/or stored in a knowledge base to assist with not only future responses, but also future determinations as to whether a particular matter should be urgent. Control then continues to step S440 where the control sequence ends.

While the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for handling a communication comprising:
   automatically searching for and harvesting, via a content aggregator, one or more communications posted on one or more information sources on a distributed network;
   analyzing, with the cooperation of a processor, the one or more communications;
   identifying a communication that should be handled in an urgent manner;
   sorting urgent communications and non-urgent communications;
   removing, via a filtering process, the non-urgent communications;
   determining one or more parties to handle the urgent communication; and
   appending knowledge base information to the urgent communication, wherein the knowledge base information includes one or more of filter criteria and contact information;
   forwarding the urgent communication and the appended knowledge base information to the one or more parties;
   determining a status of the one or more parties;
   notifying a non-available party of the urgent communication;
   detecting a change in status of the non-available party;
   determining one or more additional parties to handle the urgent communication; and
   appending information relevant to the analysis of the determination of urgency to the urgent communication and a degree of confidence.

2. The method of claim 1, further comprising generating a template for use by the one or more parties to respond to the urgent communication.

3. The method of claim 1, wherein the communication is a text-based communication or an html-based communication from one or more of a blog, discussion forum, social networking site, news feed, web feed, group, and a web site with an API (Application Program Interface).

4. The method of claim 1, wherein the filtering occurs prior to receipt of the communications by an automatic call distributor and the forwarding is in one or more of a contact center, an interaction center, a call center and a responder network.

5. The method of claim 1, further comprising initiating a real-time communications session between the one or more parties determined to handle the urgent communication.

6. The method of claim 1, wherein the analyzing is based on one or more of: whether the communication includes an implied threat, whether the information appears to be reaching out, whether there is "choice" language in the information, business reasons, a specificity about a problem or matter, whether there is a negative description, whether information such as names, phone numbers, quotes, customer service information or part numbers are included in the information, whether there is time and place information, keywords, analysis of a number of posts and recency, author weighting, hits, followers, posts, cross-correlation of the information to other information, other posts and mashups.

7. The method of claim 1, wherein the information sources include one or more of a blog, a discussion form, a social networking site, a news feed, a web feed, a blog feed, a video feed, a group, a wiki, a mashup and folksonomies.

8. A non-transitory computer readable information storage media having stored thereon information, that when executed by a processor, causes to be performed the steps in claim 1.

9. A system that handles communications comprising:
a content aggregator that automatically searches for and harvests one or more communications posted on one or more information sources on a distributed network;
an urgency analysis module that analyzes, with the cooperation of a processor, the one or more communications and identifies a communication that should be handled in an urgent manner;
a filter module that sorts urgent communications and non-urgent communications and removes, via a filtering process, the non-urgent communications;
a response assistant that appends additional information to the urgent communication, the additional information including knowledge base information and one or more of filter criteria, and contact information;
a routing module that determines one or more parties to handle the urgent communication and forwards the urgent communication to the one or more parties; and
a decision engine that cooperates with a presence database to determine a status of the one or more parties, notify a non-available party of the urgent communication, detect a change in status of the non-available party, and determine one or more additional parties to handle the urgent communication, wherein information relevant to the analysis of the determination of urgency and a degree of confidence are appended to the urgent communication.

10. The system of claim 9, further comprising a response assistant that generates a template for use by the one or more parties to respond to the urgent communication.

11. The system of claim 9, wherein the communication is a text-based communication or an html-based communication from one or more of a blog, discussion forum, social networking site, news feed, web feed, group, and a web site with an API (Application Program Interface) or wherein the information sources include one or more of a blog, a discussion form, a social networking site, a news feed, a web feed, a blog feed, a video feed, a group, a wiki, a mashup and folksonomies.

12. The system of claim 9, wherein the filtering occurs prior to receipt of the communications by an automatic call distributor and the forwarding is in one or more of a contact center, an interaction center, a call center and a responder network.

13. The system of claim 9, wherein a real-time communications session is initiated between the one or more parties determined to handle the urgent communication.

14. The system of claim 9, wherein the analyzing is based on one or more of: whether the communication includes an implied threat, whether the information appears to be reaching out, whether there is "choice" language in the information, business reasons, a specificity about a problem or matter, whether there is a negative description, whether information such as names, phone numbers, quotes, customer service information or part numbers are included in the information, whether there is time and place information, keywords, analysis of a number of posts and recency, author weighting, hits, followers, posts, cross-correlation of the information to other information, other posts, and mashups.

\* \* \* \* \*